Patented Apr. 27, 1943

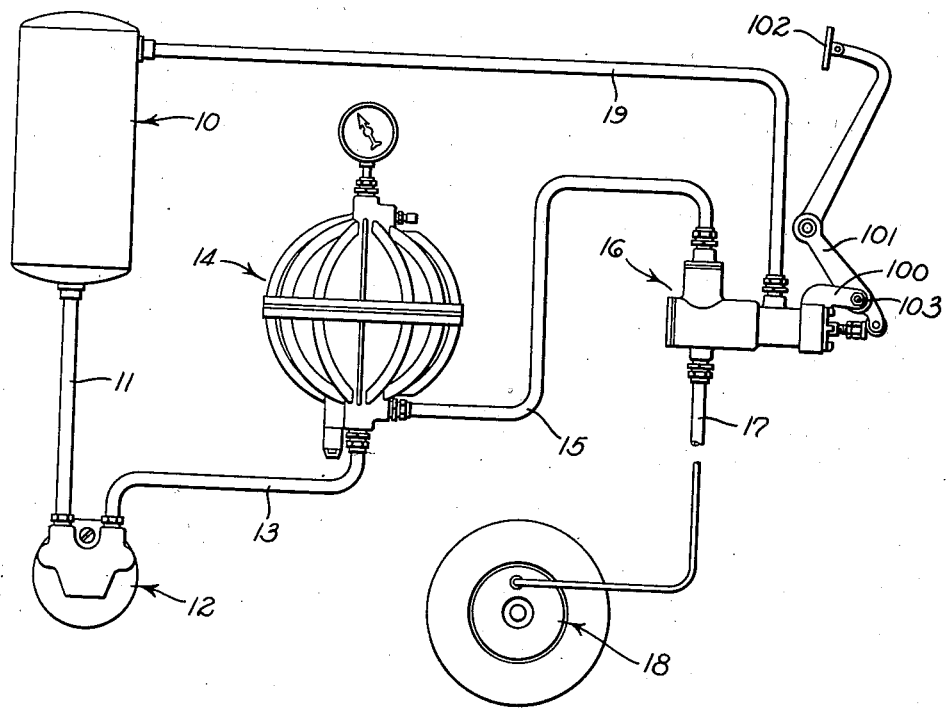

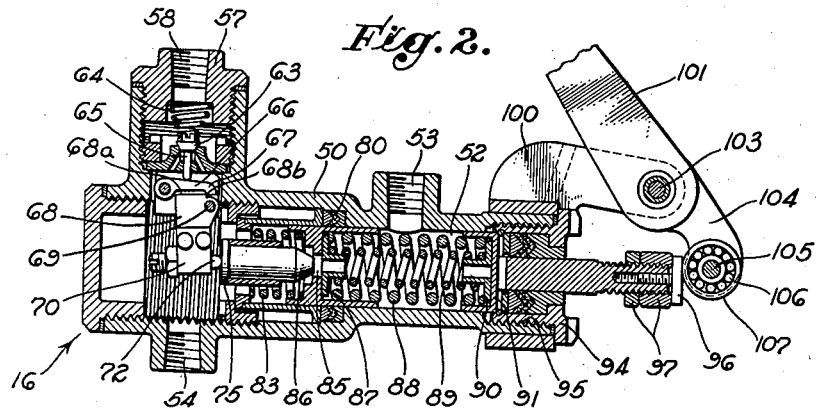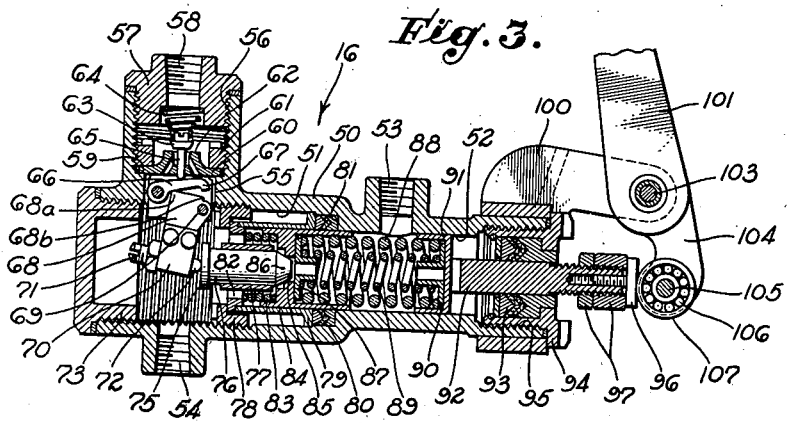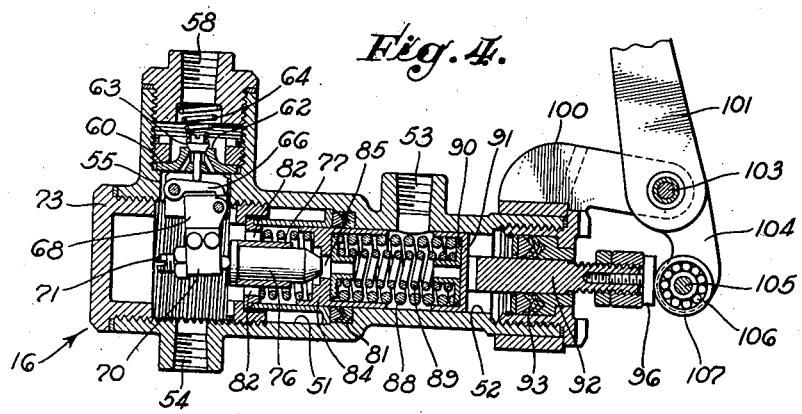

2,317,846

UNITED STATES PATENT OFFICE 2,317,846

BRAKE VALVE

Rodney B. Campbell, Los Angeles, Calif., assignor to John Eley, Jr., Los Angeles, Calif.

Original application April 26, 1940, Serial No. 331,790. Divided and this application June 11, 1941, Serial No. 397,572

8 Claims. (Cl. 303—54)

This application is a division of my copending application for Pressure accumulator device, Serial No. 331,790, filed April 26, 1940, now abandoned to which reference is hereby made.

This invention primarily relates to a fluid braking system, and more particularly to such a system having particular utility in the aircraft industry, and therefore will be described in connection therewith. Certain parts and combinations of my system, however, are readily susceptible to other uses, and I do not intend to be limited to the preferred embodiment described.

Aircraft, and particularly aircraft of the large, heavy transport type, are commonly equipped with fluid operated brake systems, in which an operating fluid, such as oil, is transmitted from a source of supply such as a pump through suitable conduits and a valve device to the fluid operated brakes of the vehicle. Valve means are normally provided in the line of the conduits for opening the conduits and permitting the operating fluid to flow to the brake mechanism to operate the same, and the normal operating pressure of the operating fluid is commonly in the neighborhood of five hundred pounds per square inch. In normal operation of such prior art systems it has been discovered, however, that when the brakes are applied to stop the travel of a heavy vehicle, such as an airplane, a large amount of friction is developed in the operation, which dissipates in the form of heat into the brake mechanism. Consequently, the column of operating fluid used to actuate the braking mechanism also absorbs a considerable amount of this frictional heat, which immediately expands the fluid, causing a large increase in the pressure thereof. This pressure increase may quickly raise the pressure of the operating fluid from the normal working pressure of, for example, 500 pounds per square inch, to an abnormally high pressure, sometimes attaining 2000 pounds per square inch or more.

This abnormal rise in pressure of the operating fluid has a number of disadvantages. For example, it creates an abnormal and dangerous pressure strain on the hydraulic equipment. Furthermore, and what is more serious, the increase in pressure increases the braking action tending to lock the brakes of the airplane, which may operate unevenly between the several brakes, causing serious accidents with their attendant loss of property and life.

It is therefore a primary object of my invention to provide a fluid operated braking system for aircraft and other vehicles in which the pressure of the operating fluid delivered to the braking mechanism of the vehicle is at all times automatically maintained below a predetermined maximum.

It is a further object of my invention to provide a novel valve device which will accomplish the foregoing object, and which includes a main valve and an auxiliary valve, the latter being automatically operable in response to a rise in pressure of the operating fluid to relieve the pressure thereon and maintain it below a predetermined maximum.

Another object of my invention is to provide a fluid operated braking system including a valve device, in which the operation of the actuating or control mechanism, normally manually operated, is not critical to maintain a predetermined braking pressure applied by the operating fluid.

Still another object of my invention is to provide a valve device of the type described in which only a small application of force is required to open the main valve thereof against the relatively high pressure of the operating fluid tending to maintain the valve closed.

Other objects and advantages will become evident in the following specification and in the drawings, in which:

Fig. 1 is a diagrammatic view of my fluid braking system.

Fig. 2 is a vertical sectional view taken through the valve device of my invention.

Fig. 3 is a view similar to Fig. 2, showing the device with the parts in the position assumed when the foot pedal is depressed.

Fig. 4 is a view similar to Fig. 2, showing the device with the parts in the position assumed when the relief valve is open.

Referring to Fig. 1 of the drawings, I show a fluid supply tank 10 connected by means of piping 11 to the input side of a high pressure pumping unit 12, the output side of which is connected by a pipe 13 to the input side of an accumulator means 14, the output side of which is in turn connected by a conduit 15 to a valve means 16, the valve means 16 having a tubing 17 connecting the same to a fluid brake mechanism 18, and also being connected by means of an exhaust pipe 19 back to the fluid supply tank 10. The accumulator means 14 is shown and described in detail in my said application Serial No. 331,790, to which reference is made, being claimed therein and forming no part of the present invention.

As best shown in Figs. 2, 3, and 4, the valve means 16 of my invention includes a housing 50 having a major bore 51 and a minor bore 52, the minor bore having communicating therewith a threaded exhaust opening 53 in which is connected the exhaust pipe 19, and the major bore having communicating therewith an output supply opening 54 which threadedly receives the tubing 17 communicating with the fluid brake mechanism 18, the major bore also having communicating therewith an opening 55, the upper end of which is counterbored and threaded at 56 to receive a plug 57 provided with a threaded opening 58 which receives the conduit 15.

The counterbore 56 forms a shoulder 59 on which is seated a valve seat element 60 held in position by a follower ring 61 and providing a valve seat 62 on which a movable valve element 63 is adapted to seat, being normally held in seating position thereon by a compression spring 64 which in turn engages the plug 57. The valve element 63 has a downwardly projecting stem 65 which in turn engages the upper surface of a pivoted cam dog 66, the lower surface of which is provided with a projecting shoulder 67. Adapted to engage the lower surface of the cam dog 66 and the projecting shoulder 67 is a cam element 68 pivoted on a pivot pin 69 and having a depending portion 70 which depends into the major bore 51 and has extending therethrough an adjustable screw 71 having a rounded inner end 72 which projects inwardly from the depending portion. The outer end of the major bore 51 is closed by a plug 73, which may be removed to permit adjustment of the adjustable screw 71.

The rounded inner end 72 of the adjustable screw 71 engages a flat head 75 formed on a cylindrical valve member 76 which is slidably journaled in a sleeve member 77 which is held in position between a ring element 78 threaded into the threaded portion of the major bore 51 and a sleeve 79 which abuts against a packing 80, the latter in turn being held by a shoulder 81 formed by the major bore. The sleeve member 77 is provided with a plurality of openings 82 therethrough, and the inner face of the sleeve member is engaged by a coil spring 83, the other end of which in turn engages an axially movable valve seat member 84 which is journaled in the sleeve 79 and the minor bore 52, the latter being of the same internal diameter. The valve seat member 84 is provided with a valve opening 85 in which the inner tapered end 86 of the cylindrical valve member 76 is adapted to seat.

Engaging the inner end of the movable valve seat member 84 is an annular spring guide element 87 which is in turn engaged by a pair of concentrically disposed coil springs 88 and 89, the other ends of which engage a second spring guide element 90 which is centrally disposed in a cup-shaped member 91 fixed on the inner end of an actuating arm 92. The actuating arm 92 passes outwardly through a stuffing box 93 which is retained in place by a threaded plug 94 threadedly received in a counterbore 95 of the minor bore 52. The outer end of the piston arm 92 is tapped to receive an adjustable head member 96, the position of which may be fixed by suitable lock nuts 97 carried on the actuating arm 92.

Suitably connected to the housing 50 is a bracket 100 to which is pivoted a foot brake lever 101, the upper end of which is provided with a foot brake pedal 102, as shown in Fig. 1, the foot brake lever being pivoted to the bracket by a pivot pin 103. The lower end of the foot brake lever 101 depends at 104 below the pivot pin 103 and is provided with a stub axle 105 on which is mounted a ball bearing unit 106 having an outer race 107 which at all times engages the adjustable head member 96.

In operation, my braking system is designed to deliver not to exceed a predetermined pressure to the fluid braking mechanism 18. The pumping unit 12 delivers operating fluid from the fluid supply tank 10 under relatively high pressure, normally in the neighborhood of four or five hundred pounds per square inch, although obviously any other pressures may be used as desired, through the pipe 13 to the accumulator means 14, from whence the fluid flows through the conduit 15 to the valve means 16.

When it is desired to supply operating fluid to the fluid brake mechanism 18 to operate the brakes of a vehicle, the foot pedal 102 is depressed, causing the foot brake lever 101 to rotate about its pivot pin 103, and the ball bearing unit 106 engaging the head member 96 forces the actuating arm 92 with the cup-shaped member 91 to the left, as viewed in Fig. 3, which exerts a resilient leftward pressure through the coil springs 88 and 89 on the auxiliary movable valve seat member 84, causing the same to move to the left, carrying with it the cylindrical valve member 76. Since the flat head 75 of the cylindrical valve member 76 engages the rounded inner end 72 of the adjustable screw 71, leftward movement of the cylindrical valve member causes the cam element 68 to rotate about its pivot pin 69. Before rotation of the cam element 68, it is in its neutral position as shown in Figs. 2 and 4, in which the shoulder 68b thereof engages the projecting shoulder 67 of the pivoted cam dog 66. Upon the initial rotation of the cam element 68, the shoulder 68b exerts a cam action through the projecting shoulder 67 and the pivoted cam dog 66 on the stem 65 of the valve element 63, raising the same against the action of the compression spring 64 and the pressure of the operating fluid above the valve element. Since the shoulder 68b is positioned close to the pivot 69 and the stem 65 engages the pivoted cam dog 66 fairly close to the pivot of the cam dog, the mechanical advantage derived thereby is amply sufficient to require very little pressure to be exerted by the cylindrical valve member 76 on the cam element 68 to initially raise the valve element 63 from its valve seat 62, thus relieving the pressure differential across the valve seat element 60 to allow the remaining movement of the valve element 63 to be made without the exertion of much raising force thereon. After the valve element has been slightly raised from its valve seat 62 by the initial opening movement of the cam element 68, relieving the pressure differential normally tending to maintain the valve element in seated position on its valve seat, the leftward shoulder 68a of the cam element engages the under side of the pivoted dog 66, and continued rotation of the cam element 68 thereby causes the remaining opening movement of the valve element 63 at a greatly increased rate so as to quickly open the valve. As soon as the valve element 63 has been raised off its seat 62, the operating fluid flows downwardly around the cam element 68 in the major bore 51, through the supply opening 54 into the tubing 17 to the fluid brake mechanism 18 to operate the brakes of the vehicle. As long as the brake pedal 102 is depressed, the parts may remain in the positions shown in Fig. 3 to permit the application of the full pressure of the operating fluid in the line to the brake actuating mechanism 18. However, actuation of the fluid brake mechanism 18 during normal braking action generates a large amount of heat through friction, a part of which, at least, is transferred to the operating fluid, raising the temperature thereof, and thus increasing the pressure thereof. For example, I have found that when a standard equipped airplane is landing, the pressure rise in the tubing supplying pressure fluid to operate the brakes, on the application of the brakes of the vehicle, may be in the neighborhood of 1000 pounds per square inch or higher, which normally tends to increase the braking action of the fluid brake mechanism thereof, causing the brakes of the vehicle to lock, greatly endangering the landing of the airplane and endangering the lives of the occupants.

My invention is designed to obviate these dangers and to maintain the fluid pressure in the tubing 17 below a predetermined maximum so as to apply a substantially constant braking force through the fluid brake mechanism 18 to prevent the brakes from locking. This is accomplished by initially adjusting the maximum compressibility of the coil springs 88 and 89 by adjustment of the adjustable head member 96 so that when the fluid pressure in the tubing 17 and the leftward end of the major bore 51 rises above the force exerted by the coil springs 88 and 89 on the axially movable valve seat member 84, the fluid pressure operating on the leftward end of the valve seat member 84 will cause the same to move to the right against the action of the coil springs 88 and 89, thus permitting the valve element 63 to seat on its seat 62, which causes the cylindrical valve member 76 to move to the right to the position shown in Fig. 4, and causes the axially movable valve member 84 to move to the right to the position shown in Fig. 4, in which the cylindrical valve member is out of engagement with the valve opening 85. As soon as this occurs, pressure fluid may flow through the openings 82, around the cylindrical valve member 76, through the valve opening 85 and the minor bore 52 into the exhaust opening 53, from whence excess operating fluid discharges through the exhaust pipe 19 back into the fluid supply tank 10. Obviously, as soon as the fluid pressure on the leftward end of the axially movable valve seat member 84 falls below the force exerted by the coil springs 88 and 89, the latter will move the valve seat member to the left until the inner tapered end 86 of the cylindrical valve member 76 is seated in the valve opening 85, at which time the valve opening will be closed to further flow of fluid therethrough. Thus, even though the operator maintains the foot pedal 102 in depressed position, the fluid pressure delivered to the fluid brake mechanism 18 is maintained below a predetermined maximum, and the brakes of the vehicle cannot lock.

When the foot pedal 102 is released so as to permit the brake lever 101 to rotate to retracted position, as shown in Fig. 2, the pressure of the operating fluid in the tubing 17 is relieved through the valve opening 85 directly into the exhaust pipe 19 so as to take all fluid pressure off the fluid brake mechanism 18, which is the normal position of the parts when not in operation.

Although I have described a preferred embodiment of my invention, it is to be understood that it or parts thereof may be used in other connections without departing from the spirit of the invention, and that I do not intend to be limited to the construction or embodiments shown or described but intend to be accorded the full scope of the following claims.

I claim as my invention:

1. In a valve device, the combination of: a housing having an inlet opening, a supply opening, and a discharge opening; main valve means in said housing adapted to be opened to permit a flow of fluid therethrough from said inlet opening to said supply opening; valve operating means in said housing adapted to operate said main valve means, said valve operating means including a cam mechanism whereby the application of a relatively small amount of force thereto causes it to apply a relatively large amount of force tending to open said main valve means; auxiliary valve means in said housing communicating between said supply opening and said discharge opening, said auxiliary valve means including a movable valve seat member and a movable valve member adapted to seat on said seat member, one of said members being operatively connected to said valve operating means; and actuating means operatively connected to one of said members and adapted to be actuated to move said members to operate said valve operating means to open said main valve means, said auxiliary valve means being adapted to open in response to a predetermined rise in fluid pressure in said supply opening independently of the actuation of said actuating means.

2. In a valve device, the combination of: a housing having an inlet opening, a supply opening, and a discharge opening; main valve means in said housing adapted to be opened to permit a flow of fluid therethrough from said inlet opening to said supply opening; valve operating means in said housing adapted to operate said main valve means, said valve operating means including a cam mechanism whereby the application of a relatively small amount of force thereto causes it to apply a relatively large amount of force tending to open said main valve means; auxiliary valve means in said housing communicating between said supply opening and said discharge opening, said auxiliary valve means including a movable valve seat member and a movable valve member adapted to seat on said seat member, one of said members being operatively connected to said valve operating means; actuating means operatively connected to one of said members and adapted to be actuated to move said members to operate said valve operating means to open said main valve means, said auxiliary valve means being adapted to open in response to a predetermined rise in fluid pressure in said supply opening independently of the actuation of said actuating means; and lever means mounted on a pivot and having one end in engagement with said actuating means, said lever means rotating about said pivot upon the application of force to the other end thereof to operate said actuating means.

3. In a valve device, the combination of: a housing having a longitudinal bore therein comprised of a major bore and a minor bore of smaller diameter than said major bore providing a shoulder therebetween, said housing having an inlet opening and a supply opening communicating with said major bore and a discharge opening communicating with said minor bore; a sleeve member in said major bore and engaging said shoulder, said sleeve member having the same internal diameter as said minor bore; main valve means in said inlet opening adapted to be opened to permit a flow of fluid therefrom into said bore; main valve operating means in said housing adapted to be actuated to open said main valve means; a tubular valve seat member journaled for axial movement in said minor bore and said sleeve member between said discharge opening and said inlet and supply openings; a valve member adapted to seat in said valve seat member to prevent fluid flow from either said supply opening or said inlet opening to said discharge opening, said valve member being axially movable to engage said valve operating means to open said main valve means; and actuating means operatively connected to said valve seat member for moving it and said valve member to open said main valve means.

4. In a valve device, the combination of: a housing having a longitudinal bore therein comprised of a major bore and a minor bore of smaller diameter than said major bore providing a shoulder therebetween, said housing having an inlet opening and a supply opening communicating with said major bore and a discharge opening communicating with said minor bore; annular packing means in said major bore engaging said shoulder; a sleeve member in said major bore and engaging said packing means, said sleeve member having the same internal diameter as said minor bore; main valve means in said inlet opening adapted to be opened to permit a flow of fluid therefrom into said longitudinal bore; main valve operating means in said housing adapted to be actuated to open said main valve means; a tubular valve seat member journaled for axial movement in said minor bore and said sleeve member between said discharge opening and said inlet and supply openings; a valve member adapted to seat in said valve seat member to prevent fluid flow from either said supply opening or said inlet opening to said discharge opening, said valve member being axially movable to engage said valve operating means to open said main valve means; and actuating means operatively connected to said valve seat member for moving it and said valve member to open said main valve means.

5. In a valve device, the combination of: a housing having a longitudinal bore therein comprised of a major bore and a minor bore of smaller diameter than said major bore providing a shoulder therebetween, at least a portion of said major bore being internally threaded, said housing having an inlet opening and a supply opening communicating with said major bore and a discharge opening communicating with said minor bore; a sleeve member in said major bore and engaging said shoulder, said sleeve member having the same internal diameter as said minor bore; follower means threaded into said major bore and engaging said sleeve member to retain the same in said major bore; main valve means in said inlet opening adapted to be opened to permit a flow of fluid therefrom into said longitudinal bore; main valve operating means in said housing adapted to be actuated to open said main valve means; a tubular valve seat member journaled for axial movement in said minor bore and said sleeve member between said discharge opening and said inlet and supply openings; a valve member adapted to seat in said valve seat member to prevent fluid flow from either said supply opening or said inlet opening to said discharge opening, said valve member being axially movable to engage said valve operating means to open said main valve means; and actuating means operatively connected to said valve seat member for moving it and said valve member to open said main valve means.

6. In a valve device, the combination of: a housing having an inlet opening, a supply opening, and a discharge opening; main valve means in said housing adapted to be opened to permit a flow of fluid therethrough from said inlet opening to said supply opening; valve operating means in said housing adapted to operate said main valve means, said valve operating means including a pivoted force-multiplying lever engaging said main valve means whereby the application of a relatively small amount of force thereto causes it to rotate to apply a relatively large amount of force tending to open said main valve means; auxiliary valve means in said housing communicating between said supply opening and said discharge opening, said auxiliary valve means including a movable valve seat member and a movable valve member adapted to seat on said seat member, one of said members being operatively connected to said lever; and actuating means operatively connected to one of said members and adapted to be actuated to move said members to rotate said lever to open said main valve means, said auxiliary valve means being adapted to open in response to a predetermined rise in fluid pressure in said supply opening independently of the actuation of said actuating means.

7. In a valve device, the combination of: a housing having an inlet opening, a supply opening, and a discharge opening; main valve means in said housing adapted to be opened to permit a flow of fluid therethrough from said inlet opening to said supply opening; valve operating means in said housing adapted to operate said main valve means, said valve operating means including a system of pivoted force-multiplying levers one of which engages said main valve means whereby the application of a relatively small amount of force thereto causes it to rotate to apply a relatively large amount of force tending to open said main valve means, the other of said levers engaging said one lever; auxiliary valve means in said housing communicating between said supply opening and said discharge opening, said auxiliary valve means including a movable valve seat member and a movable valve member adapted to seat on said seat member, one of said members being operatively connected to said other lever; and actuating means operatively connected to one of said members and adapted to be actuated to move said members to rotate said other lever to open said main valve means, said auxiliary valve means being adapted to open in response to a predetermined rise in fluid pressure in said supply opening independently of the actuation of said actuating means.

8. In a valve device, the combination of: a housing having an inlet opening, a supply opening, and a discharge opening; main valve means in said housing adapted to be opened to permit a flow of fluid therethrough from said inlet opening to said supply opening; valve operating means in said housing adapted to operate said main valve means, said valve operating means including a cam mechanism engageable with said main valve means and constructed and arranged so that the application of a relatively small amount of force thereto causes it to apply a relatively large initial opening force to said main valve means with a relatively slow rate of opening movement of said main valve means and the continued application of such a relatively small amount of force to said cam mechanism then causes it to apply a relatively small opening force to said main valve means with a relatively rapid rate of movement of said main valve means; auxiliary valve means in said housing communicating between said supply opening and said discharge opening, said auxiliary valve means including a movable valve seat member and a movable valve member adapted to seat on said seat member, one of said members being operatively connected to said cam mechanism; and actuating means operatively connected to one of said members and adapted to be actuated to move said members to rotate said cam mechanism to open said main valve means, said auxiliary valve means being adapted to open in response to a predetermined rise in fluid pressure in said supply opening independently of the actuation of said actuating means.

RODNEY B. CAMPBELL.